(12) United States Patent
Kawarada

(10) Patent No.: US 10,132,357 B2
(45) Date of Patent: Nov. 20, 2018

(54) PROPELLER SHAFT

(71) Applicant: TOYOTA JIDOSHA KABUSHIKI KAISHA, Toyota-shi, Aichi-ken (JP)

(72) Inventor: Kohki Kawarada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 15/361,294

(22) Filed: Nov. 25, 2016

(65) Prior Publication Data

US 2017/0159715 A1 Jun. 8, 2017

(30) Foreign Application Priority Data

Dec. 3, 2015 (JP) ................. 2015-236996

(51) Int. Cl.
*F16D 3/205* (2006.01)
*F16C 35/073* (2006.01)
*F16C 3/02* (2006.01)
*F16D 3/223* (2011.01)
*F16C 27/06* (2006.01)

(52) U.S. Cl.
CPC .............. *F16C 35/073* (2013.01); *F16C 3/02* (2013.01); *F16C 27/066* (2013.01); *F16C 2326/06* (2013.01); *F16D 3/2055* (2013.01); *F16D 2003/22316* (2013.01); *Y10S 464/905* (2013.01)

(58) Field of Classification Search
CPC ........ F16C 35/073; F16C 3/02; F16C 27/066; F16C 2326/06; F16D 2003/22316; F16D 3/2055; Y10S 464/905

USPC ........... 464/111, 146, 178; 280/777; 384/537
See application file for complete search history.

(56) References Cited

U.S. PATENT DOCUMENTS

| | | | | |
|---|---|---|---|---|
| 1,801,953 | A * | 4/1931 | Caminez | F01M 13/04 464/178 |
| 5,019,016 | A * | 5/1991 | Uchman | F16D 3/2055 464/111 |
| 6,171,196 | B1 * | 1/2001 | Welschof | F16D 3/227 464/146 X |
| 6,913,105 | B2 * | 7/2005 | Masuda | B60K 17/24 |
| 7,717,796 | B2 * | 5/2010 | Hirakawa | F16D 3/2055 |

FOREIGN PATENT DOCUMENTS

| | | |
|---|---|---|
| JP | 2006-123781 A | 5/2006 |
| JP | 2006-123789 A | 5/2006 |

* cited by examiner

*Primary Examiner* — Greg Binda
(74) *Attorney, Agent, or Firm* — Oliff PLC

(57) ABSTRACT

A propeller shaft includes a first shaft, a second shaft, a slide joint, a bearing, an annular member, and a first stopper portion. The annular member is placed between an outer peripheral surface of a thin shaft portion and an inner peripheral surface of the bearing. The annular member is configured such that the bearing is fitted to the annular member. An outer peripheral surface of the annular member has a diameter larger than a diameter of a first shaft portion extending on a shaft-body-portion side relative to the annular member provided on the thin shaft portion. The first stopper portion is placed at a position on a side closer to a shaft body portion than the annular member provided on the thin shaft portion. The first stopper portion is configured to prevent an axial movement of the annular member toward the shaft body portion.

4 Claims, 7 Drawing Sheets

PROPELLER SHAFT

INCORPORATION BY REFERENCE

The disclosure of Japanese Patent Application No. 2015-236996 filed on Dec. 3, 2015 including the specification, drawings and abstract is incorporated herein by reference in its entirety.

BACKGROUND

1. Technical Field

The present disclosure relates to a propeller shaft to be used in a vehicle and the like, and particularly relates to a divided propeller shaft.

2. Description of Related Art

For example, a so-called FR vehicle with a front engine and a rear-wheel drive uses a propeller shaft in order to transmit a driving force from the engine to rear wheels. The propeller shaft is required to have high durability, and the propeller shaft is firm. Further, a divided propeller shaft including a plurality of shaft members arranged in a vehicle front-rear direction so as to be connected to each other is used conventionally.

In the meantime, at the time of a vehicle collision, an engine room is destroyed effectively with respect to an impact from a front side, so as to relax the impact, thereby making it possible to protect an occupant. At this time, it is proposed that the engine inside the engine room is configured to move rearward toward a vehicle rear side and the propeller shaft is configured to be contractible axially so that the propeller shaft also absorbs the impact. One example of such an impact absorption structure of the propeller shaft is described in Japanese Patent Application Publication No. 2006-123781 (JP 2006-123781 A).

JP 2006-123781 A describes a propeller shaft configured such that a first shaft on a front side of a vehicle is connected to a second shaft on a rear side by a tripod-type constant velocity joint, an outer member of the constant velocity joint is provided in a rear end of the first shaft, and a center bearing is provided slidably in a connecting shaft portion of the second shaft configured such that its inner-member attached distal end is inserted into in the outer member. At the time of a vehicle collision, the first shaft on the front side moves rearward relative to the second shaft on the rear side due to an impact force from a vehicle front side, and the outer member of the first shaft collides with the center bearing provided in the second shaft. The center bearing is press-fitted to an outer peripheral surface of an intermediate shaft portion of the connecting shaft portion having a uniform diameter so that the center bearing slides on the connecting shaft portion of the second shaft toward a rear side of the vehicle due to a force from the outer member. The sliding of the center bearing causes a sliding frictional force between an inner peripheral surface of the center bearing and the outer peripheral surface of the intermediate shaft portion of the second shaft. Due to the frictional force, an impulse force to the vehicle is absorbed.

SUMMARY

As described above, the propeller shaft is firm and its rigidity is higher than that of a body of the vehicle. Therefore, in the structure of JP 2006-123781 A, for example, in a case where an axial contraction of the propeller shaft is restricted, e.g., a case where the sliding of the center bearing does not occur for some reasons, the propeller shaft does not contract before the body or the like of the vehicle is destroyed. This results in that other members such as a body are not destroyed, so that the impact force cannot be absorbed.

The present disclosure provides a propeller shaft that preferably contracts in an axial direction at the time of a collision of a vehicle so as to more relax an impact to the vehicle.

A propeller shaft according to one aspect of the present disclosure includes a first shaft, a second shaft, a slide joint, a bearing, an annular member, and a first stopper portion. The first shaft includes a shaft body portion and a thin shaft portion. The thin shaft portion is arranged coaxially with the shaft body portion in an axial direction of the shaft body portion, and the thin shaft portion has a diameter smaller than a diameter of the shaft body portion. The second shaft is connected to the first shaft. The slide joint includes an inner member placed in one end of the thin shaft portion, and an outer member placed in one end of the second shaft. The inner member is inserted inside the outer member. The bearing is placed around the thin shaft portion. The annular member is placed between an outer peripheral surface of the thin shaft portion and an inner peripheral surface of the bearing. The annular member is configured such that the bearing is fitted to the annular member. An outer peripheral surface of the annular member has a diameter larger than a diameter of a first shaft portion extending on a shaft-body-portion side relative to the annular member provided on the thin shaft portion. The first stopper portion is placed at a position on a side closer to the shaft body portion than the annular member provided on the thin shaft portion. The first stopper portion is configured to prevent an axial movement of the annular member toward the shaft body portion.

In the propeller shaft according to the above aspect, the thin shaft portion may include the first shaft portion and a second shaft portion. The second shaft portion may be connected to a second-shaft side of the first shaft portion. The second shaft portion may have a diameter smaller than the diameter of the first shaft portion. The annular member may be placed on the second shaft portion.

The propeller shaft according to the above aspect may further include a second stopper portion. The second stopper portion may be placed on a shaft-body-portion side of the annular member so as to prevent the axial movement of the bearing toward the shaft body portion. The second stopper portion may be more vulnerable than the first stopper portion.

In the propeller shaft according to the above aspect, a diameter of the outer peripheral surface of the annular member may be smaller than a smallest diameter of an inner peripheral surface of a tubular portion of the outer member.

The propeller shaft according to the above aspect may further include a third stopper portion. The third stopper portion may be placed on a second-shaft side of the annular member so as to prevent the axial movement of the bearing toward the second shaft. The third stopper portion may have a maximum outside diameter smaller than the smallest diameter of the inner peripheral surface of the tubular portion of the outer member.

In the propeller shaft according to the above aspect, the diameter of the outer peripheral surface of the annular member to which the bearing is fitted is larger than the diameter of the first shaft portion of the thin shaft portion, the first shaft portion extending on a shaft-body-portion side relative to the annular member. Further, the first stopper portion is provided at a position on the thin shaft portion on a side closer to the shaft body than the annular member so as to prevent the axial movement of the annular member toward the shaft body portion. Accordingly, when a vehicle collision occurs and the outer member collides with the bearing, the bearing comes off from the annular member, so that the bearing easily moves toward the shaft body portion along the first shaft portion. This allows the propeller shaft to preferably contract in the axial direction at the time of a vehicle collision. In a vehicle provided with the propeller shaft, it is possible to preferably absorb, namely, relax an impact to the vehicle by a body or the like of the vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
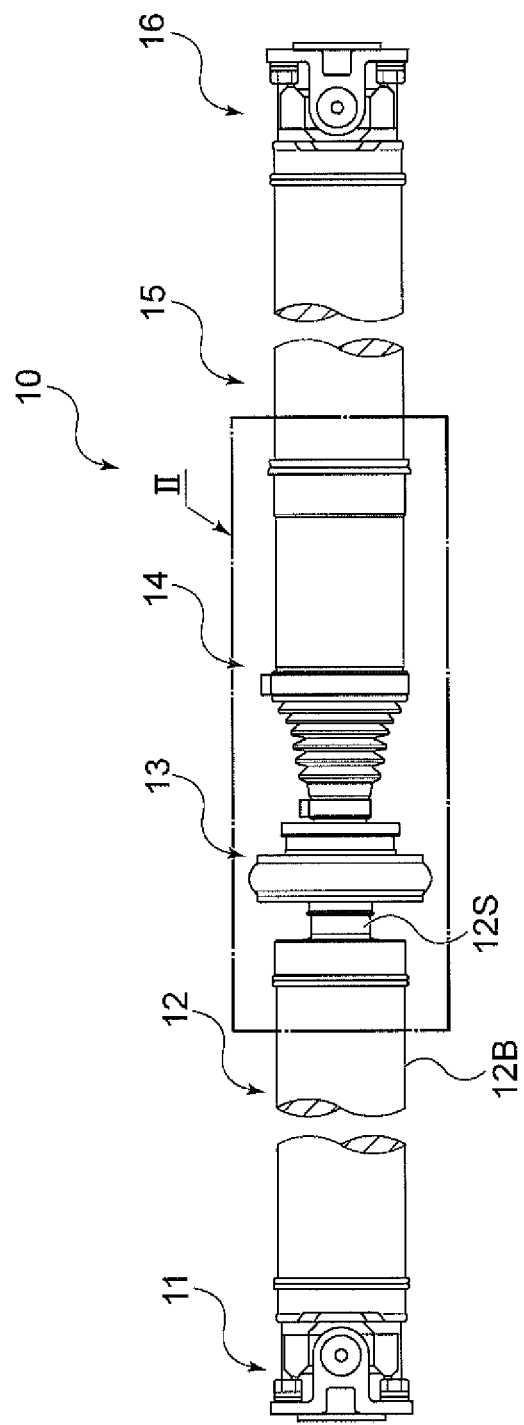
FIG. 1 is a side view of a propeller shaft according to one embodiment of the present disclosure.

The following describes an embodiment of the present disclosure with reference to the attached drawings. A propeller shaft 10 according to one embodiment of the present disclosure is illustrated in FIG. 1. The propeller shaft 10 is provided in a lower part of a vehicle. This vehicle is a rear wheel drive vehicle and is configured as a standard-sized automobile configured such that a vertical four-cylinder gasoline engine is provided in a vehicle front portion. However, the propeller shaft according to the present disclosure can be applied to a four-wheel drive vehicle, and the present disclosure does not limit a drive system, an engine configuration, and the like of a vehicle to which the present disclosure is applied.

As illustrated in FIG. 1, the propeller shaft 10 includes: a front-side joint 11; a front propeller shaft 12 as a first shaft (shaft member) connected to the front-side joint 11; a center bearing 13 (corresponding to a bearing of the present disclosure) for elastically and rotatably supporting the front propeller shaft 12; a joint 14 connected to the front propeller shaft 12; a rear propeller shaft 15 as a second shaft (shaft member) connected to the joint 14; and a rear-side joint 16 connected to the rear propeller shaft 15. As such, the propeller shaft 10 is a divided propeller shaft. Note that a positional relationship between the center bearing 13 and the joint 14 in the propeller shaft 10 is reversed to a positional relationship of them in JP 2006-123781 A. The present disclosure is also applicable to a propeller shaft having a positional relationship (an arrangement in which a center bearing is placed behind a joint) like the one in JP 2006-123781 A.

The propeller shaft 10 connects a transfer to a rear differential mechanism. The propeller shaft 10 transmits a rotation of the transfer to the rear differential mechanism at a constant velocity rotation. The front-side joint 11 connects the front propeller shaft 12 to the transfer, and the rear side joint 16 connects the rear propeller shaft 15 to the rear differential mechanism. An overall configuration of such a propeller shaft 10 itself is generally similar to a conventional propeller shaft.

The propeller shaft 10 of the present embodiment has a feature in a connection portion between the front propeller shaft 12 and the rear propeller shaft 15, particularly, a vicinity of the center bearing 13.

Figure 2:
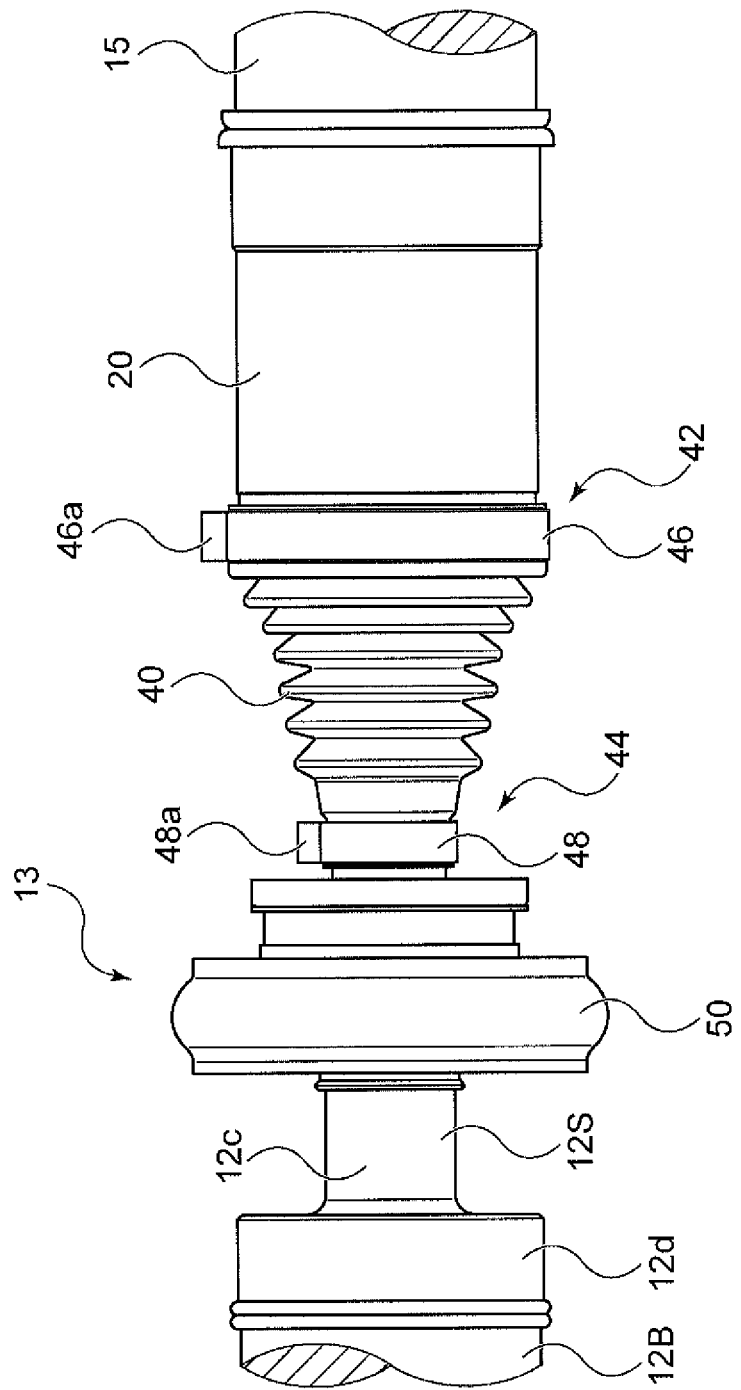
FIG. 2 is an enlarged view of a region II in FIG. 1.
Figure 3:
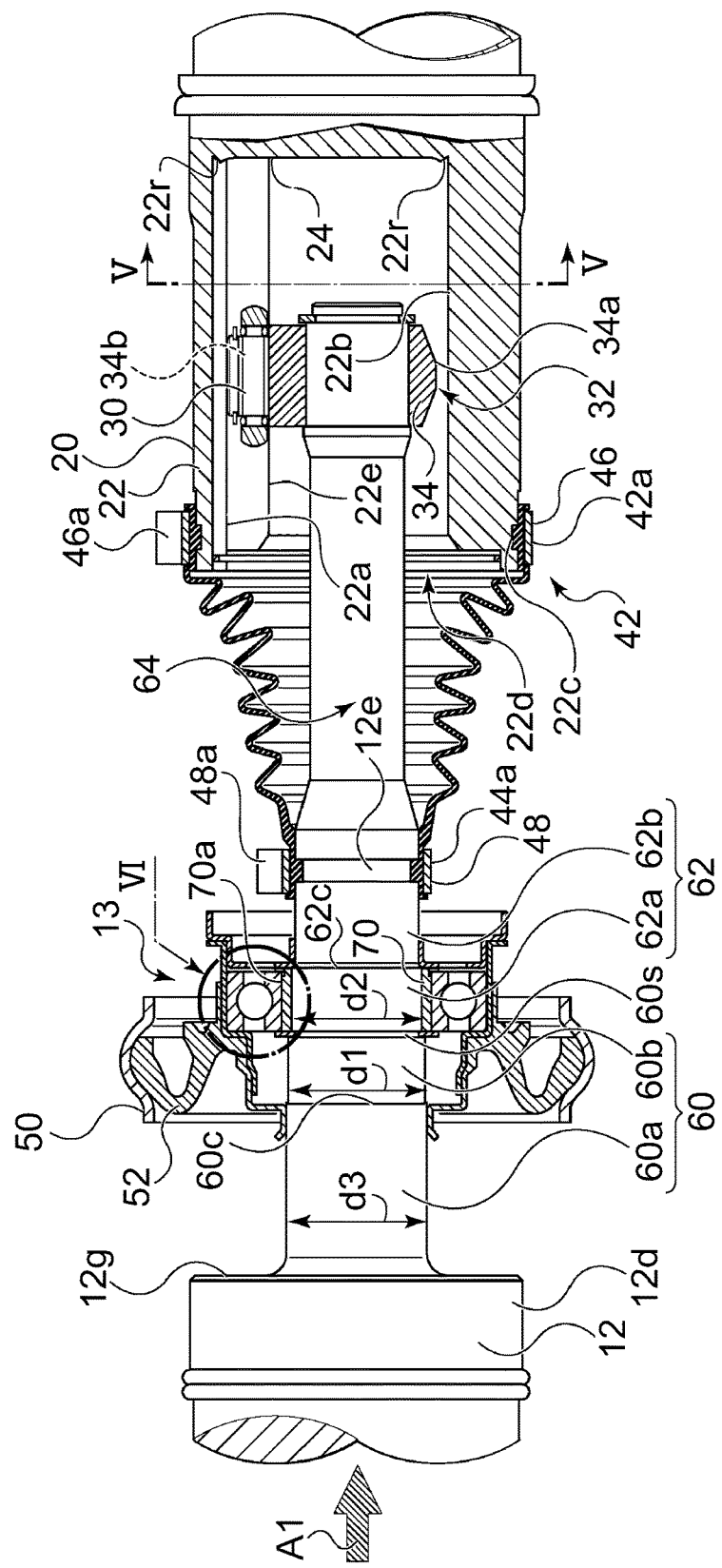
FIG. 3 is a partial sectional view of a part corresponding to the propeller shaft in FIG. 2.

FIG. 2 is an enlarged view of a region (that is, a connection portion region) surrounded by a square II in FIG. 1, and FIG. 3 is a partial sectional view of the connection portion region in FIG. 2.

Figure 4:
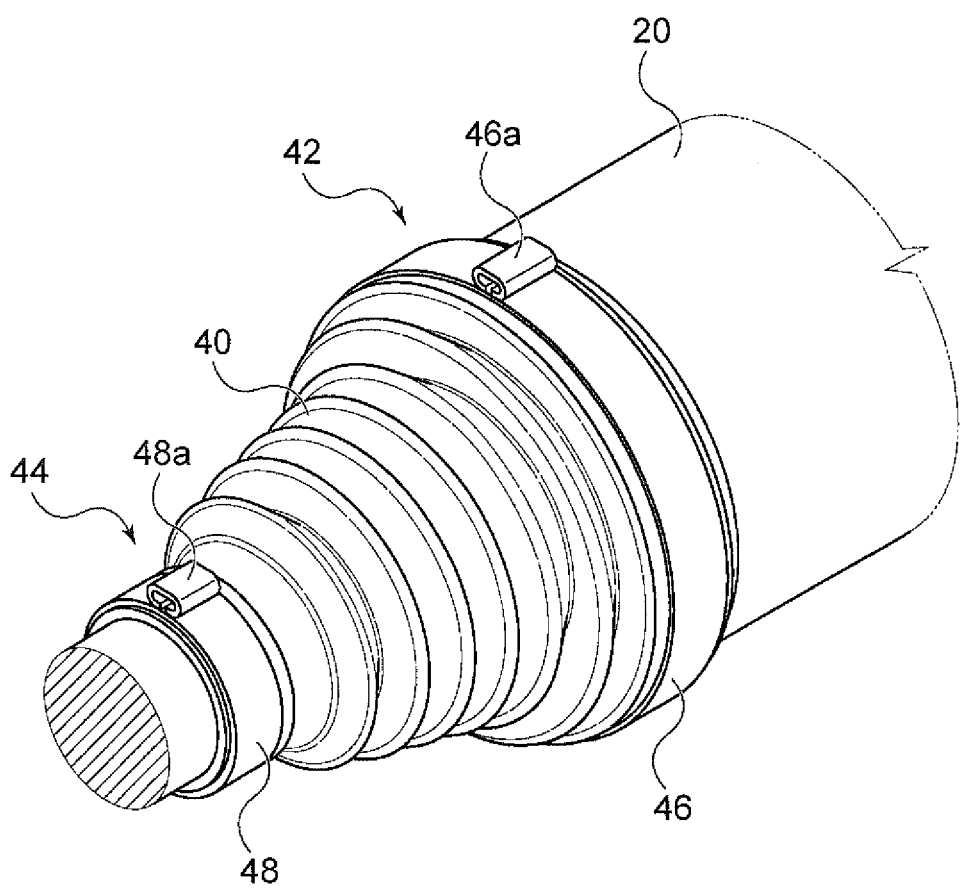
FIG. 4 is a perspective view around a boot of a joint of the propeller shaft of FIG. 1.

Initially described is the joint 14. FIG. 4 is a perspective view around the joint 14 in the propeller shaft 10 in FIG. 1. The joint 14 is a slide-type joint, more specifically, a slide-type tripod constant velocity joint. The joint 14 includes: an outer member 20 placed in the rear propeller shaft 15; an inner member 32 including three rollers 30 and placed in the front propeller shaft 12; and a boot (dust cover) 40 fixed from the outer member 20 to the front propeller shaft 12 so as to cover its connecting portion. The boot 40 is constituted by resin having elasticity, and has a bellows shape in which crest parts and valley parts are arranged alternately in an axial direction. The boot 40 is formed such that its diameter increases toward an outer-member side. The boot 40 includes a large outside diameter portion 42 provided on a side closer to the rear propeller shaft 15, and a small outside diameter portion 44 provided on a side closer to the front propeller shaft 12.

The outer member 20 is provided in a front end (one end) of the rear propeller shaft 15. The outer member 20 is a bottomed tubular member. The outer member 20 has a cup shape with a tubular portion 22 and a bottom portion 24. The outer member 20 includes: roller guide portions 22a and ridge portions 22b formed on an inner peripheral side of the tubular portion 22; and a boot engagement groove 22c formed in a front end of an outer peripheral surface thereof.

The outer member 20 has an open end portion 22d. Note that the boot 40 is provided so as to cover the open end portion 22d of the outer member 20. Further, the outer member 20 and the rear propeller shaft 15 are provided coaxially such that a central axis of the outer member 20 corresponds to a central axis of the rear propeller shaft 15.

Three roller guide portions 22a are formed. The three roller guide portions 22a are provided on the inner peripheral side of the outer member 20 at regular intervals (at an interval of 120 degrees) in a circumferential direction so as to extend axially. The roller 30 connected with the front propeller shaft 12 is slidably and rotatably fitted to the roller guide portion 22a. The roller 30 is guided by its corresponding roller guide portion 22a movably in a direction parallel to the central axis of the outer member 20 while rotating.

Further, the ridge portions 22b are provided at three places each between corresponding two of the three roller guide portions 22a. The ridge portion 22b projects radially inwardly (that is, toward a central axis side) from an inner peripheral surface of the outer member 20. The ridge portion 22b is formed along the roller guide portion 22a. The ridge portion 22b supports the roller 30 so that the roller 30 surely slides along the roller guide portion 22a. Note that, an inner surface 22e of the ridge portion 22b, which is an innermost surface in the inner peripheral surface of the tubular portion 22 of the outer member, is closest to a central axis 22o of the outer member, and the inner surface 22e extends on a virtual circle with a radius r1 around the central axis. Accordingly, the inner surface 22e can be called a smallest diameter portion of the inner peripheral surface of the tubular portion 22 of the outer member 20, and a diameter of the virtual circle with the radius r1 can be called an inner diameter of the smallest diameter portion.

The boot engagement groove 22c is formed near the open end portion 22d, on the outer peripheral surface of the outer member 20. An engageable portion 42a of the large outside diameter portion 42 of the boot 40 is engaged with the boot engagement groove 22c. A first securing band 46 is attached so as to sandwich the engageable portion 42a of the boot 40 between the first securing band 46 and the boot engagement groove 22c. A part of an outer peripheral surface of the first securing band 46 is caulked by a caulking jig (not shown) in a sandwiched manner. As a result, a generally Ω-shaped caulked portion 46a is formed in a projecting manner on the outer peripheral surface of the first securing band 46.

The inner member 32 is fixed to a shaft portion 12c (corresponding to a thin shaft portion of the present disclosure) of a connecting shaft portion 12S of the front propeller shaft 12. The front propeller shaft 12 includes a body portion 12B (corresponding to a shaft body portion of the present disclosure), and the connecting shaft portion 12S provided in a rear end (one end) of the body portion 12B so as to extend in an axial direction of the body portion 12B. Note that the body portion 12B in the front propeller shaft 12 is a part having generally the same outside diameter as the rear propeller shaft 15, and a central axis of the body portion 12B corresponds to a central axis of the connecting shaft portion 12S. The connecting shaft portion 12S is manufactured as a different body from the body portion 12B of the front propeller shaft 12. The connecting shaft portion 12S includes: the shaft portion 12c having a diameter smaller than the body portion 12B; and a large-diameter portion 12d increased in diameter as compared with the shaft portion 12c so as to have about the same diameter as the body portion 12B. The shaft portion 12c and the large-diameter portion 12d are arranged coaxially in the axial direction. The large-diameter portion 12d is fixed to a rear end of the body portion 12B by friction welding herein. Accordingly, the front propeller shaft 12 includes the body portion 12B, and the connecting shaft portion 12S (particularly, the shaft portion 12c), which are arranged coaxially in the axial direction in an integrated manner. Note that the body portion 12B and the connecting shaft portion 12S (particularly, the shaft portion 12c) may be formed integrally from the first.

The inner member 32 includes the rollers 30, and a spider 34 configured to hold the rollers 30 and fixed to the shaft portion 12c of the connecting shaft portion 12S of the front propeller shaft 12. The inner member 32 is fixed to the front propeller shaft 12 and is inserted into the outer member 20. Further, the inner member 32 is connected to the outer member 20 so as to be axially movable in the outer member 20 and swingable in a predetermined angle range. Hereby, even if respective central axes of the inner member 32 and the front propeller shaft 12 are inclined relative to the central axis of the outer member 20, rotations of the front propeller shaft 12 and the inner member 32 are transmitted to the outer member 20 at a constant velocity.

The spider 34 is constituted by a tonic spider body 34a and three roller support shafts 34b. The roller support shafts 34b have a circular-column shape and are formed integrally with the spider body 34a at regular intervals (at an interval of 120 degrees) in the circumferential direction such that the roller support shafts 34b project radially outwardly from an outer periphery of the spider body 34a. The roller support shafts 34b rotatably support respective rollers 30. The roller 30 is attached to a bearing supported by the roller support shaft 34b, and is provided so as to rotate smoothly around the roller support shaft 34b. The shaft portion 12c of the connecting shaft portion 12S of the front propeller shaft 12 has spline external teeth provided in a rear end thereof. The spline external teeth of the connecting shaft portion 12S are fitted to spline internal teeth of the spider 34, so that the spider 34 is connected to the front propeller shaft.

Figure 5:
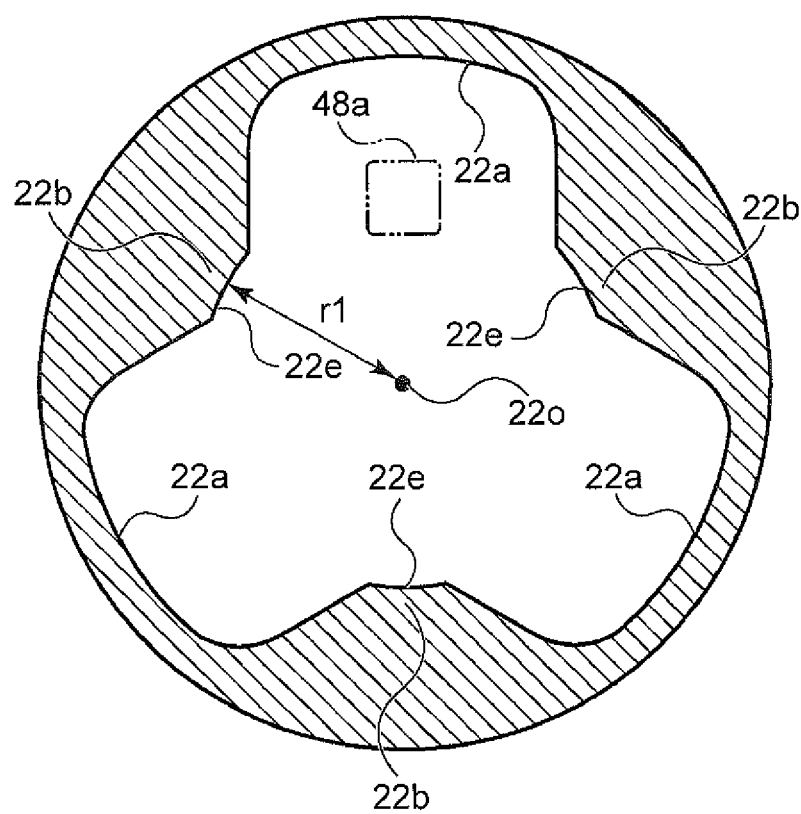
FIG. 5 is a schematic view of a section of the joint of the propeller shaft along a line V-V in FIG. 3.

Further, the connecting shaft portion 12S includes a boot engagement groove 12e on a front side relative to the spline external teeth. An engageable portion 44a of the small outside diameter portion 44 of the boot 40 is engaged with the boot engagement groove 12e. A second securing band 48 is attached so as to sandwich the engageable portion 44a of the boot 40 between the second securing band 48 and the boot engagement groove 12e. Similarly to the first securing band 46, a part of an outer peripheral surface of the second securing band 48 is caulked by a caulking jig (not shown) in a sandwiched manner. As a result, a generally Ω-shaped caulked portion 48a is formed in a projecting manner on the outer peripheral surface of the second securing band 48. Herein, the caulked portion (an outward projecting portion) 48a of the second securing band 48 connected with the small outside diameter portion 44 of the boot 40 is positioned so as to be placed inside any of the roller guide portions 22a of the outer member 20 of the joint 14 in the circumferential direction as illustrated in a reflected manner in the axial direction in FIG. 5. Further, a size of the caulked portion 48a is restricted. Note that the caulked portion 48a of the second securing band 48 generally has an outside diameter at least smaller than a part having a maximum inner diameter in the roller guide portion 22a so that the caulked portion 48a can pass through the roller guide portion 22a of the outer member 20 at the time of an axial contraction of the propeller shaft, which will be described below. This is to more smoothly achieve the axial contraction of the propeller shaft 10, which will be described below.

The connecting shaft portion 12S of the front propeller shaft 12 is rotatably supported by the center bearing 13 positioned on a front side of the joint 14. The center bearing 13 is supported by an annular elastic body 52 of an annular support member 50. The annular support member 50 is fixed and supported by a bracket (not shown) fixed to a vehicle-body side. Accordingly, as described above, the center bearing 13 can rotatably and elastically support the front propeller shaft 12 (that is, the propeller shaft 10).

Now, the connecting shaft portion 12S of the front propeller shaft 12 is configured such that the center bearing 13 is placed thereon and its diameter is decreased gradually from a body-portion-12B side toward a joint-14 side. The large-diameter portion 12d of the connecting shaft portion 12S is fixed to the body portion 12B of the front propeller shaft 12, and has a largest dimension in the connecting shaft portion 12S. A first shaft portion 60, a second shaft portion 62, and a third shaft portion 64 are provided side by side in the shaft portion 12c in the order from a side closer to the large-diameter portion 12d. The first shaft portion 60 includes: a first large-diameter shaft portion 60a provided on a body-portion-12B side; and a first small-diameter shaft portion 60b provided on a joint-14 side and having a diameter smaller than the first large-diameter shaft portion 60a. The second shaft portion 62 includes: a second large-diameter shaft portion 62a provided on a body-portion-12B side; and a second small-diameter shaft portion 62b provided on a joint-14 side and having a diameter smaller than the second large-diameter shaft portion 62a, The first small-diameter shaft portion 60b of the first shaft portion 60 is connected to the second large-diameter shaft portion 62a of the second shaft portion 62 via a step 60s. A diameter (a first diameter) d1 of the first small-diameter shaft portion 60b of the first shaft portion 60 is larger than a diameter (a second diameter) d2 of the second large-diameter shaft portion 62a of the second shaft portion 62 (d1>d2). Further, a diameter of the whole third shaft portion 64 is smaller than the second small-diameter shaft portion 62b of the second shaft portion 62. The center bearing 13 is attached to the second large-diameter shaft portion 62a of the second shaft portion 62, and the boot engagement groove 12e is formed on the second small-diameter shaft portion 62b of the second shaft portion 62. The spline external teeth are formed in a rear end (a free end portion) of the third shaft portion 64. Note that the first shaft portion 60 has two parts (the first large-diameter shaft portion 60a and the first small-diameter shaft portion 60b) having different diameters, and also includes an annular stepped portion 60c provided therebetween. However, the annular stepped portion 60c may not be provided. This also applies to the second shaft portion 62 (the second large-diameter shaft portion 62a and the second small-diameter shaft portion 62b). Note that it is preferable that a stepped portion (that is, a step) 62c of the second shaft portion 62 be provided in view of assembly (fitting engagement) of the center bearing 13.

Figure 6:
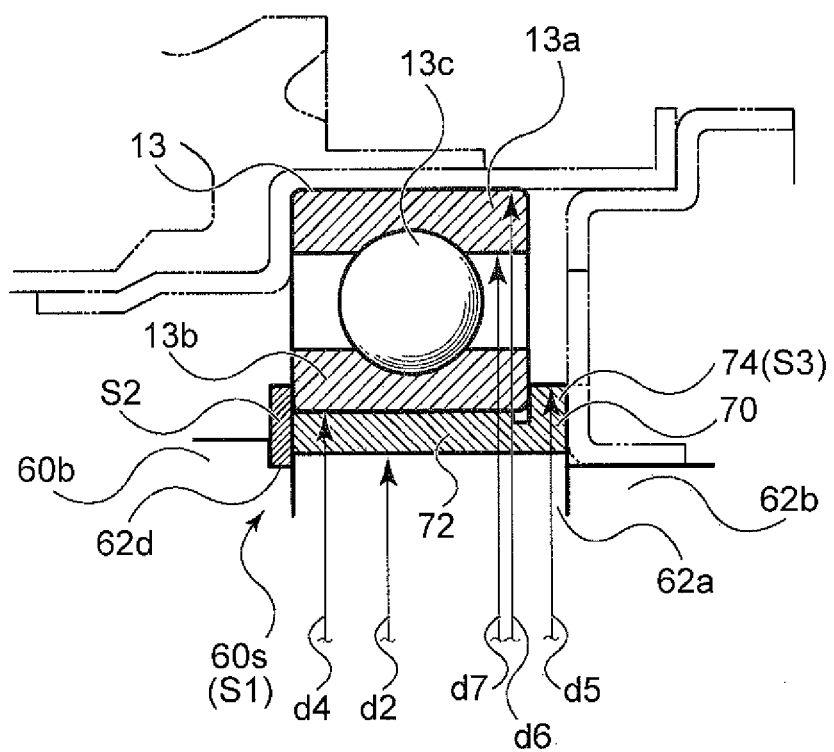
FIG. 6 is an enlarged view of a region VI in FIG. 3.

Herein, the first shaft portion 60 (particularly, the first small-diameter shaft portion 60b) on a side closer to the body portion 12B of the front propeller shaft 12 has a diameter larger than the second shaft portion 62 at which the center bearing 13 is positioned. The stepped portion (a step) 60S is formed between the second shaft portion 62 and the first shaft portion 60. Further, an annular member (a collar member) 70 is placed between an inner peripheral surface of the center bearing 13 and an outer peripheral surface of the second shaft portion 62 in the shaft portion 12c of the connecting shaft portion 12S. The annular member 70 is fitted to an outer peripheral surface of the connecting shaft portion 12S, and the center bearing 13 is fitted (or press-fitted) to an outer peripheral surface 70a of the annular member 70. Here, an enlarged view of a region surrounded by a circle VI in FIG. 3 is illustrated in FIG. 6. Note that, in FIG. 6, the annular support member 50 and the like is indicated by a broken line, and the shaft portion 12c of the connecting shaft portion 12S, the center bearing 13, and the annular member 70 are illustrated partially.

The center bearing 13 is a ball bearing, and includes an outer ring 13a, an inner ring 13b, and a rolling element (ball) 13c. The inner ring 13b of the center bearing has an inside diameter d4 larger than a diameter d3 of the first shaft portion 60, particularly, the first large-diameter shaft portion 60a. Accordingly, in order to place the center bearing 13 in the second shaft portion 62, a member for burying a gap (≈d4−d2) between the inner ring 13b and the second large-diameter shaft portion 62a is required, and the annular member 70 is provided as the member (therefore, the after-mentioned tubular portion 72 of the annular member 70 has an outside diameter d4). The annular member 70 is positioned so as to abut with the stepped portion 60s between the first shaft portion 60 and the second shaft portion 62. Particularly, in the present embodiment, the annular member 70 is positioned so as to abut with the stepped portion 60s via the after-mentioned second stopper portion S2. However, the annular member 70 may directly abut with the stepped portion 60s. Accordingly, the stepped portion 60s between the first shaft portion 60 and the second shaft portion 62, in other words, the stepped portion 60s placed on a side closer to the body portion 12B than the annular member 70 in the shaft portion 12c, is a stopper portion (a first stopper portion) S1 for preventing an axial movement of the annular member 70 toward the body portion 12B of the front propeller shaft 12. Note that the stopper portion S1 can be easily fixated by the stepped portion, thereby making it possible to easily position the annular member 70 at a predetermined position.

The propeller shaft 12 of the present embodiment is further provided with two stopper portions S2, S3 so as to restrict an axial position of the center bearing 13. One stopper portion (a second stopper portion) S2 of the two stopper portions is placed adjacently to the annular member 70 on a side closer to the body portion 12B of the front propeller shaft 12, so as to prevent an axial movement of the center bearing toward the body portion 12B of the front propeller shaft 12. The second stopper portion S2 is a member (a part) having an annular shape and projecting radially so as to work at least between the annular member and the center bearing fitted to the annular member. In a normal time, the center bearing is positioned so as to abut with the second stopper portion S2.

The second stopper portion S2 is a washer here. In order to facilitate positioning of the second stopper portion S2, an annular groove 62d is formed on a second-shaft-portion-62 side of the stepped portion 60s between the first shaft portion 60 and the second shaft portion 62. However, the annular groove 62d may be omitted. The second stopper portion S2 is a washer and thin. Therefore, the second stopper portion S2 is naturally more vulnerable than the stepped portion 60s as the first stopper portion S1 provided between the first shaft portion 60 and the second shaft portion 62. On this account, the center bearing is positioned at a predetermined position by the second stopper portion in a normal time. However, as will be described later, when the outer member 20 collides with the center bearing 13, the second stopper portion S2 breaks or deforms in priority to the first stopper portion S1, which allows the center bearing to move relative to the annular member. Note that the second stopper portion S2 is designed or selected so as not to project radially over the inner ring 13b of the center bearing 13, particularly, a radially outermost part of the inner ring 13b. However, the second stopper portion S2 is not limited to this.

Further, the other stopper portion (a third stopper portion) S3 out of the two stopper portions is placed on a rear-propeller-shaft side of the annular member 70 so as to prevent an axial movement of the center bearing 13 toward the rear propeller shaft 15. The third stopper S3 is a part (a member) having an annular shape and projecting radially. Particularly, herein, the third stopper S3 is formed integrally with a rear end of the annular member. Accordingly, the annular member 70 includes a tubular portion 72 to which the center bearing 13 is fitted, and a radially projecting portion 74. Note that the radially projecting portion 74 as the third stopper portion S3 is designed or selected so as not to project radially over the radially outermost part of the inner ring 13b of the center bearing 13. However, the third stopper portion S3 is not limited to this. In a normal time, the center bearing is positioned so as to abut with the third stopper portion S3.

An outer peripheral surface of the annular member 70 is positioned on a radially inner side relative to a smallest diameter portion 22e of the inner peripheral surface of the tubular portion 22 of the outer member 20 of the joint 14. That is, the annular member 70 has an outside diameter that is smaller than the smallest diameter portion 22e (an inside diameter thereof). Particularly, in the present embodiment, not only an outer peripheral surface of the tubular portion 72 of the annular member 70 but also an outer peripheral surface of the radially projecting portion 74 has a maximum outside diameter that is smaller than twice (2×r1) a length r1 from a central axis 14*o* of the joint 14 to the inner surface 22*e* of the ridge portion 22*b* of the joint 14. The outer peripheral surface of the radially projecting portion 74 has a maximum outside diameter d5 (d4<d5<(2×r1)). Accordingly, as will be described later, when the outer member 20 collides with the center bearing 13, the outer member 20 can be relatively moved toward the body portion 12B preferably without colliding with or making contact with the annular member 70. Note that "twice the length r1 from the central axis 14*o* of the joint 14 to the inner surface 22*e* of the ridge portion 22*b* of the joint 14" is shorter than an outside diameter d6 of the outer ring 13*a* of the center bearing 13, and is further preferably shorter than an inside diameter d7 of the outer ring 13*a* of the center bearing 13 ((r1×2)<d7<d6). Particularly, herein, "twice the length r1" has about the same length as the outside diameter of the inner ring 13*b* of the center bearing 13.

Here, only assembly of the center bearing 13 to the propeller shaft 10 is described briefly. First, the center bearing 13 is fitted to the outer peripheral surface of the tubular portion 72 of the annular member 70. This is performed until the inner ring 13*b* of the center bearing 13 abuts with the radially projecting portion 74. In the meantime, the second stopper portion S2, which is a washer, is inserted into the front propeller shaft 12 from a rear side, and then positioned. After the second stopper portion S2 is placed, the annular member 70 with the center bearing is fitted to the second shaft portion 62 from the rear side of the front propeller shaft 12 until the annular member 70 (or the center bearing 13) abuts with the second stopper portion S2, and the annular member 70 is placed around the second large-diameter shaft portion 62*a*. Thus, the center bearing 13 is fixed to the front propeller shaft 12.

Next will be described operations and effects of the propeller shaft 10 having the above configuration.

When a vehicle provided with the propeller shaft 10 has a front collision with a wall, for example, an impact force is applied to the vehicle from a front side toward a rear side. Accordingly, a force (see an arrow A1 in FIG. 3) to move the front propeller shaft 12 of the propeller shaft 10 toward the rear propeller shaft 15 is applied to the front propeller shaft 12. As a result, the rollers 30 provided in the rear end of the front propeller shaft 12 are guided along the roller guide portions 22*a* of the joint 14, so that the rear end 12*f* of the front propeller shaft 12 abuts with the bottom portion 24 of the outer member 20 of the joint. Herein, recessed portion 22*r* are annually provided on both an inner surface and an outer surface of a boundary portion between the tubular portion 22 and the bottom portion 24 of the outer member 20, so that the boundary portion is easily broken. Because of this, when the rear end 12*f* of the front propeller shaft 12 collides with the bottom portion 24 of the outer member 20 of the joint with a force to some extent, the bottom portion 24 is broken, so that the shaft portion 12*c* of the front propeller shaft 12 advances inside the tubular rear propeller shaft 15. At this time, the open end portion 22*d* of the outer member 20 of the joint 14 breaks through the boot 40, so that the second securing band 48 enters the open end portion 22*d*. At this time, the caulked portion 48*a* of the second securing band 48 connected with the small outside diameter portion 44 of the boot 40 is positioned so as to be placed, in the circumferential direction, inside any of the roller guide portions 22*a* of the outer member 20 of the joint, so that the caulked portion 48*a* can easily pass through the open end portion 22*d* of the outer member 20. As a result, the center bearing 13 collides with the distal end (the open end portion) 22*d* of the outer member 20 of the joint.

Here, the washer as the second stopper portion S2 is more vulnerable than the stepped portion 60*s* as the first stopper portion S1 that restricts the movement of the annular member 70. Further, the center bearing 13 is fitted to the outer peripheral surface of the tubular portion 72 of the annular member 70, and the outer peripheral surface of the tubular portion 72 has an outside diameter larger than the first shaft portion 60 (60*a*, 60*b*) of the front propeller shaft 12. Accordingly, due to the collision between the distal end of the outer member 20 of the joint 14 and the center bearing 13, the center bearing 13 slides on the outer peripheral surface of the tubular portion 72 of the annular member 70. Hereby, the second stopper portion S2 breaks or deforms, so that the center bearing 13 can move along the first shaft portion of the shaft portion 12*c* toward the large-diameter portion 12*d* of the connecting shaft portion 12S of the front propeller shaft 12, that is, the center bearing 13 can come off from the annular member 70. Since the inner ring 13*b* of the center bearing 13 has an inside diameter larger than an outside diameter of the first shaft portion 60 (60*a*, 60*b*) of the connecting shaft portion 12S, when the center bearing 13 comes off from the annular member 70, there is preferably nothing serving as a resistance in particular. As a result, the center bearing 13 is axially pushed by the outer member 20, so that the center bearing 13 can move until it collides with a radial wall surface 12*g* between the large-diameter portion 12*d* of the connecting shaft portion 12S and the first shaft portion 60. Note that, as the center bearing 13 comes off from the annular member 70 due to the movement of the front propeller shaft 12, the center bearing 13 comes off from the annular elastic body 52 of the annular support member 50.

Figure 7:
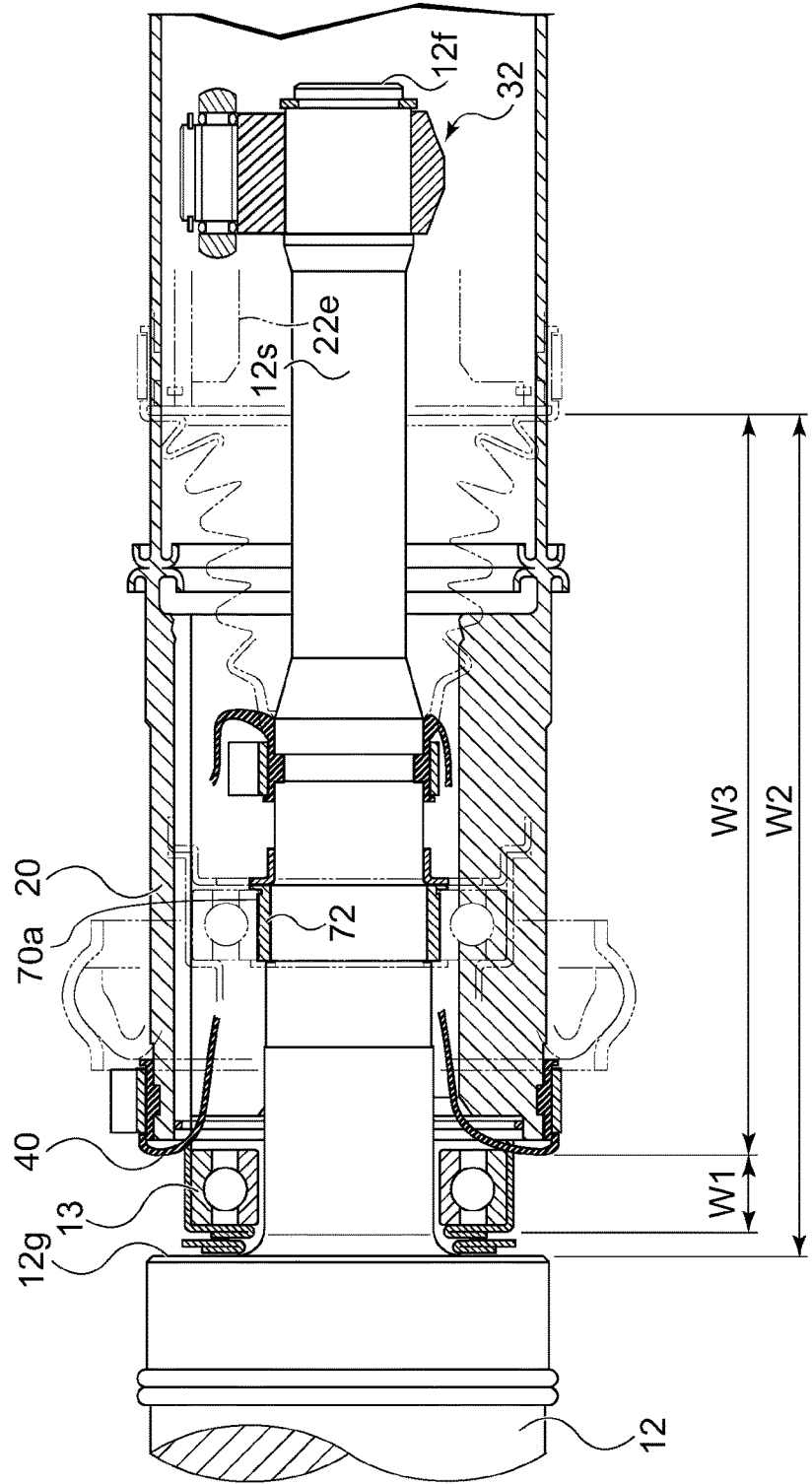
FIG. 7 is a schematic view illustrating one example of a state of the propeller shaft of FIG. 1 after a vehicle collision.

A state where the center bearing 13 collides with the radial wall surface 12*g* is illustrated in FIG. 7. FIG. 7 schematically illustrates the broken boot 40 and the like. Note that, in FIG. 7, the center bearing 13, the joint 14, and the annular support member 50 in the state of FIG. 3 are indicated by a broken line.

As such, in the present embodiment, at the time of a vehicle collision, the outer member 20 of the joint 14 collides with the center bearing 13, so that the fitting between the center bearing 13 and the annular member 70 is released. Accordingly, the center bearing 13 can move smoothly (preferably without any particular resistance) generally on the shaft portion 12*c* of the connecting shaft portion 12S toward the body portion 12B of the front propeller shaft 12. Accordingly, at the time of a vehicle collision, the propeller shaft can preferably contract axially, so that the body of the vehicle is destroyed, thereby making it possible to more preferably relax an impact on the vehicle.

Further, in the present embodiment, the outer member 21 can substantially relatively move axially by an axial length W3 (≈W2−W1) obtained by substantially subtracting an axial width W1 of the center bearing 13 from a length W2 between the distal end of the outer member 20 and the radial wall surface 12*g* in an initial state, until the outer member 20 collides with the radial wall surface 12*g*. The length W2 can be set to be longer according to a vehicle, and therefore, it is possible to easily contract the propeller shaft 10 in its longitudinal direction (the axial direction) just by that length. Accordingly, according to the propeller shaft 10 of the present embodiment, it is possible to move or contract the propeller shaft 10 over a longer distance with a lower force at the time of a vehicle collision.

Further, in order to enable a preferred movement of the center bearing, as for the connecting shaft portion 12S, the outside diameter (that is, the inner diameter of the center bearing 13) of the tubular portion 72 of the annular member 70 should be larger than the outside diameter of the first shaft portion 60. This increases design freedom of each part of the connecting shaft portion. For example, even in a case where a part of the connecting shaft portion 12S on its body-portion-12B side is made large so as to increase rigidity of the connecting shaft portion, if an annular member having an outside diameter suitable for that is selected or designed, a preferred movement of the center bearing is secured. Accordingly, it is possible to preferably increase the rigidity of the connecting shaft portion while securing a preferred movement of the center bearing.

Further, when the outside diameter (that is, the inner diameter of the center bearing 13) of the tubular portion 72 of the annular member 70 is made larger than the outside diameter of the first shaft portion 60, a smooth movement of the center bearing 13 is attainable, thereby making it possible to omit surface finishing of the first shaft portion 60. Even if a surface of the first shaft portion is rough, that does not affect the movement of the center bearing 13. Accordingly, the propeller shaft 10 of the present embodiment can be manufactured more easily than the propeller shaft described in JP 2006-123781 A, at a low cost.

The present disclosure has been explained based on the embodiment, but the present disclosure is not limited to the above embodiment. For example, the second stopper portion S2 may be provided integrally with the annular member 70. However, in this case, the radially projecting portion as the third stopper portion S3 may be constituted as a different body from the annular member 70. This is to secure an assembly property of the center bearing 13 to the annular member 70. Further, the second stopper portion and the third stopper portion are each not limited to a member or a part continuous over a whole circumference or a generally whole circumference in the circumferential direction. The second stopper portion and the third stopper portion may be provided only partially in the circumferential direction to an extent that prevents the axial movement of the center bearing or to an extent that define their axial positions in a normal time.

Further, in the propeller shaft, the stepped portion 60s is provided between the first shaft portion 60 and the second shaft portion 62 as the first stopper portion S1 that prevents the axial movement of the annular member 70 toward the body portion 12B of the front propeller shaft 12. However, the first stopper portion S1 is not limited to the stepped portion. It is preferable that the first stopper portion S1 be realized by a difference in diameter between the first shaft portion and the second shaft portion where the annular member is positioned, so as to prevent the annular member positioned in the second shaft portion from axially moving toward the body portion, and a part between the first shaft portion and the second shaft portions may be formed as a tapered portion increased in diameter as it comes closer to the first shaft portion, so that the part serves as the first stopper portion S1. Further, the first shaft portion and the second shaft portion may have a uniform diameter, and the annular member 70 may be joined (e.g., by welding) to a predetermined position of the second shaft portion, so as to define the first stopper portion.

Further, in the above embodiment, as described above, the annular member and the like is applied in terms of the center bearing so as to restrict and permit the axial movement of the center bearing. However, the annular member and the like may be applied in terms of a bearing other than the center bearing. That is, the bearing in the present disclosure may be a bearing other than the center bearing.

Note that the propeller shaft 10 of the above embodiment includes two shaft members. However, the present disclosure may be applied to a propeller shaft including three or more shaft members.

The embodiment of the present disclosure is not limited to the above embodiment, and the present disclosure includes all modifications, applications, and equivalents included in the concept of the present disclosure defined by claims. Accordingly, the present disclosure should not be interpreted restrictively, but can be also applied to any other techniques belonging to the scope of the concept of the present disclosure.

What is claimed is:

1. A propeller shaft comprising:
   a first shaft including a shaft body portion and a thin shaft portion, the thin shaft portion being arranged coaxially with the shaft body portion in an axial direction of the shaft body portion, the thin shaft portion having a diameter smaller than a diameter of the shaft body portion;
   a second shaft connected to the first shaft;
   a slide joint including an inner member placed in one end of the thin shaft portion, and an outer member placed in one end of the second shaft, the inner member being inserted inside the outer member;
   a bearing being placed around the thin shaft portion, wherein the bearing comprises an outer race, an inner race and a rolling member;
   an annular member placed between an outer peripheral surface of the thin shaft portion and an inner peripheral surface of the inner race of the bearing, the annular member being configured such that the bearing is fitted to the annular member, an outer peripheral surface of the annular member having a diameter larger than a diameter of a first shaft portion that extends on a shaft-body-portion side relative to the annular member provided on the thin shaft portion, a diameter of the outer peripheral surface of the annular member is smaller than a smallest diameter of an inner peripheral surface of a tubular portion of the outer member; and
   a first stopper portion placed at a position on a side closer to the shaft body portion than the annular member provided on the thin shaft portion, the first stopper portion being configured to prevent an axial movement of the annular member toward the shaft body portion.

2. The propeller shaft according to claim 1, wherein:
   the thin shaft portion includes the first shaft portion and a second shaft portion;
   the second shaft portion is connected to a second-shaft side of the first shaft portion;
   the second shaft portion has a diameter smaller than the diameter of the first shaft portion; and
   the annular member is placed on the second shaft portion.

3. The propeller shaft according to claim 1, further comprising:
   a second stopper portion placed on a shaft-body-portion side of the annular member so as to prevent the axial movement of the bearing toward the shaft body portion, the second stopper portion being more likely to break or deform than the first stopper portion.

4. The propeller shaft according to claim 1, further comprising:

a third stopper portion placed on a second-shaft side of the annular member so as to prevent the axial movement of the bearing toward the second shaft, the third stopper portion having a maximum outside diameter smaller than a smallest diameter of the inner peripheral surface of a tubular portion of the outer member.

* * * * *